US006323424B1

United States Patent
He

(10) Patent No.: US 6,323,424 B1
(45) Date of Patent: *Nov. 27, 2001

(54) MULTIPLE ELECTRICAL BOX MOUNTING SYSTEM HAVING REMOVABLE RINGS

(76) Inventor: Ping He, 1062 Thistlegate Rd., Agoura, CA (US) 91301

( * ) Notice: Subject to any disclaimer, the term of this patent is extended or adjusted under 35 U.S.C. 154(b) by 0 days.

This patent is subject to a terminal disclaimer.

(21) Appl. No.: 09/533,228

(22) Filed: Mar. 23, 2000

Related U.S. Application Data

(63) Continuation-in-part of application No. 09/335,545, filed on Jun. 18, 1999, now Pat. No. 6,188,022.

(51) Int. Cl.[7] .................................................. H01H 9/02
(52) U.S. Cl. ............................................. 174/58; 220/3.5
(58) Field of Search ........................... 174/58, 50, 60, 174/17 R; 248/906, 27.1; 439/535; 220/3.3, 3.5, 3.92, 3.94, 4.02, 3.2, 3.6

(56) References Cited

U.S. PATENT DOCUMENTS

| | | | |
|---|---|---|---|
| 4,747,506 | * | 5/1988 | Stuchlik ............................ 220/3.6 X |
| 5,263,676 | * | 11/1993 | Medlin, Jr. et al. ............. 248/906 X |
| 5,740,936 | * | 4/1998 | Nash ................................ 220/3.92 X |
| 6,188,022 | * | 2/2001 | He .................................... 174/58 |

* cited by examiner

Primary Examiner—Dean A. Reichard
Assistant Examiner—Dhiru R Patel
(74) Attorney, Agent, or Firm—Roy A. Ekstrand

(57) ABSTRACT

A generally planar electrical box mounting bracket is securable to a convenient wall stud and is supported by a wall spacer. The bracket defines an aperture and a pair of countersunk recesses diagonally positioned with respect to the aperture. A pair of flushmounting fasteners are received within the countersunk recesses and threadably engaged the tabs of an electrical box to secure the electrical box against the interior or rear face of the bracket. A second pair of fasteners are positioned diagonally at opposite corners with respect to the center aperture and are used to secure an electrical box ring upon the front face of the bracket. The attachment of the electrical box ring is independent of the attachment of the electrical box to the bracket thereby facilitating the removal and assembly of the electrical box ring to the bracket without disturbing the attachment of electrical box. In an alternate embodiment, a generally planar electrical box mounting bracket is securable to a convenient pair of adjacent wall studs which defines a plurality of apertures and pairs of countersunk diagonal recesses.

6 Claims, 4 Drawing Sheets

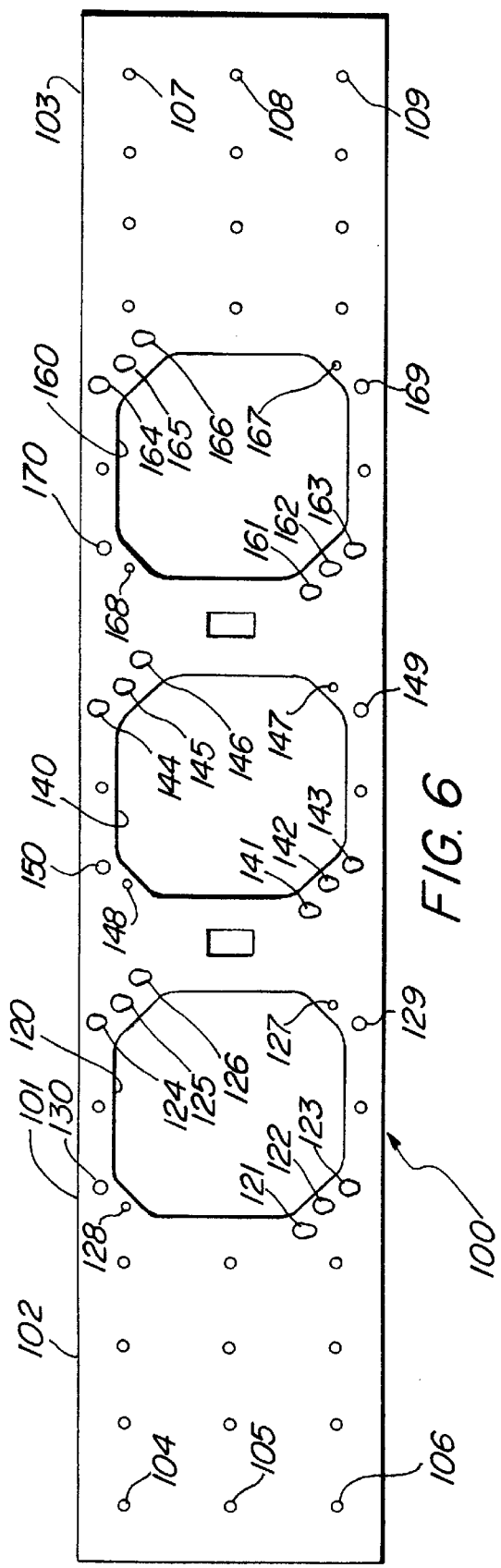
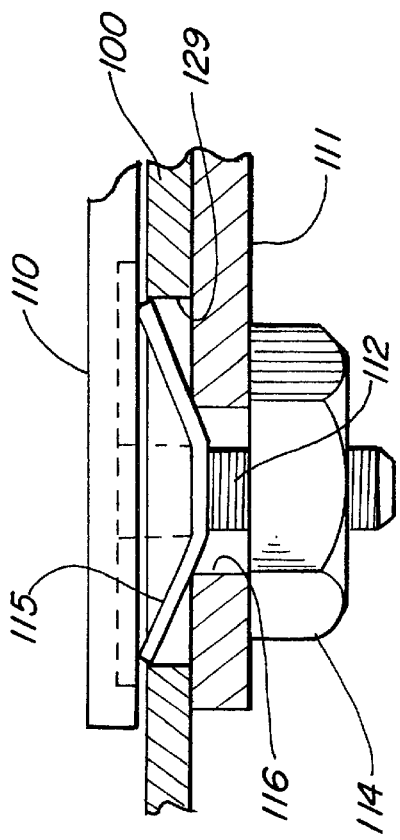

MULTIPLE ELECTRICAL BOX MOUNTING SYSTEM HAVING REMOVABLE RINGS

CROSS REFERENCE TO RELATED APPLICATION

This application is a continuation-in-part of a application filed Jun. 18, 1999 having Ser. No. 09/335,545 now U.S. Pat. No. 6,188,022 and entitled ELECTRICAL BOX MOUNTING SYSTEM HAVING REMOVABLE RINGS for which the applicant is the applicant of this application.

FIELD OF THE INVENTION

This invention relates generally to electrical power distribution apparatus and particularly to systems employed in supporting electrical connecting boxes for use in dwellings or other similar structures.

BACKGROUND OF THE INVENTION

The electrical power distribution systems utilized in most modern dwellings and other structures such as commercial structures or the like typically utilized a plurality of electrical boxes secured conveniently about the various dwelling structure areas together with a plurality of power connecting wires utilized to communicate electrical power to each of the electrical boxes from the power utility source which typically provides a plurality of protective circuit breakers and fuses. Each of the electrical boxes supports one or more coupling and/or control devices such as coupling plug receptacles and/or electrical switches which are secured to the connecting box and which are coupled to the connecting wires. In most structures, some type of wall covering such as dry-wall or wall board, paneling, or other modular wall panels is provided upon the wall interiors. Apertures are formed in such wall covering materials to expose the plug receptacles and/or switches for access by the user. In most electric power distribution systems each box is fitted with a ring joined to the electrical box which provides an opening or large aperture and a surrounding or encircling riser portion. The size of the riser portion is determined by the wall thickness or wall covering thickness to be utilized.

In a typical electric box installation of the type to which the present invention pertains, a metal bracket is secured to the wall frame prior to the application of wall covering material. Typically, the wall frame utilizes a plurality of supporting studs to which the support bracket may be secured. The bracket defines an aperture shaped and sized to correspond roughly to the frontal opening of an electrical box which is secured to the back side of the bracket and is thus supported within the interior wall space of the wall between supporting studs. The ring is secured to the front face of the bracket utilizing a plurality of screw fasteners which pass through apertures in the bracket and which commonly join the electrical box and ring to the rear and front sides of the bracket in a combined attachment. The wall covering having suitable apertures cut therein is then applied to cover the supporting frame leaving the frontal opening of the electric box ring exposed. Coupling and control elements such as plug receptacles and/or switches may then be connected to the box wiring and secured to the electric box ring to complete the installation. In most instances a decorative cover plate is further attached to provide a safe and aesthetically pleasing overlay for the switches and plug receptacles. In some installations, the coupling and control devices are secured to the electric box ring prior to the installation of wall covering material.

While the above described prior art system of providing electrical box mounting has proven itself to be generally practical and satisfactory, a problem often arises in connection with the common fastener attachment of the electrical box and electrical box ring to the supporting bracket. In essence this common attachment imposes a restriction upon the system in which the ring may not easily be removed or changed subsequent to electric box installation upon the support bracket. The absence of the ability to remove or change the ring requires that practitioners know the thickness of wall covering material and types of receptacles or switches to be utilized at the time of installation of the electrical box and ring to the supporting bracket. This condition provides great inconvenience in the accommodation of changes or in the event of erroneous information which is later imposed or discovered following the installation of wall covering material and the completion of electric box and ring assembly to the supporting bracket. As a result, practitioners encountering the need to change ring size or ring type are presented with a difficult and time consuming process at best.

Another limitation of present systems for mounting electrical boxes and rings is found in their lack of flexible and versatile support of multiple boxes and rings. In many electric power distribution systems, a need arises to support a plurality of electrical boxes and rings within a single wall space found between a pair of wall supporting studs.

There arises therefore, a need in the art an improved electrical box mounting system in which changes of the ring may be implemented without disturbing the attachment of the electrical box to the supporting bracket.

SUMMARY OF THE INVENTION

Accordingly it is a general object of the present invention to provide an improved electric box mounting system. It is a more particular object of the present invention to provide an improved electric box mounting system which utilizes and facilitates a removable ring. It is a still more particular object of the present invention to provide an improved electrical box mounting system which facilitates assembly of the electrical box to the mounting bracket without the assembly of the electrical box ring.

In accordance with the present invention there is provided an electrical box assembly comprising: a generally planar bracket having a plurality of generally rectangular apertures, a front face, a rear face, a plurality of fastener aperture pairs each diagonally positioned with respect one of the generally rectangular apertures, a plurality of countersunk recess pairs each diagonally positioned with respect to one of the generally rectangular apertures each of which defines a second pair of fastener apertures therein; a plurality of electrical boxes each having an open face, a frontal edge and a pair of diagonally positioned inwardly extending tabs each having a tab aperture formed therein; pairs of flushmount fasteners each having a threaded portion and a fastener head, the pairs of flushmount fasteners being received in the countersunk recesses such that the fastener heads are received in the recesses and the threaded portions pass through the second pair of fastener apertures and engage the tab apertures to secure the edge of each of the electrical boxes against the rear surface; a plurality of electrical box rings each having a flange defining a pair of slots and a riser portion; and pairs of threaded fasteners threadably engaging the first pairs of fastener apertures, the electrical box rings being secured to the front face of the bracket by pairs of threaded fasteners in the first pair of fastener apertures such that the flanges are placed against the front face overlying the fastener heads of the pairs of flushmount fasteners.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 6 sets forth a front view of a multiple box and ring supporting bracket constructed in accordance with the present invention; and FIG. 7 sets forth a partial section view of an alternate box attachment of the present invention.

DESCRIPTION OF THE PREFERRED EMBODIMENT

Figure 1:
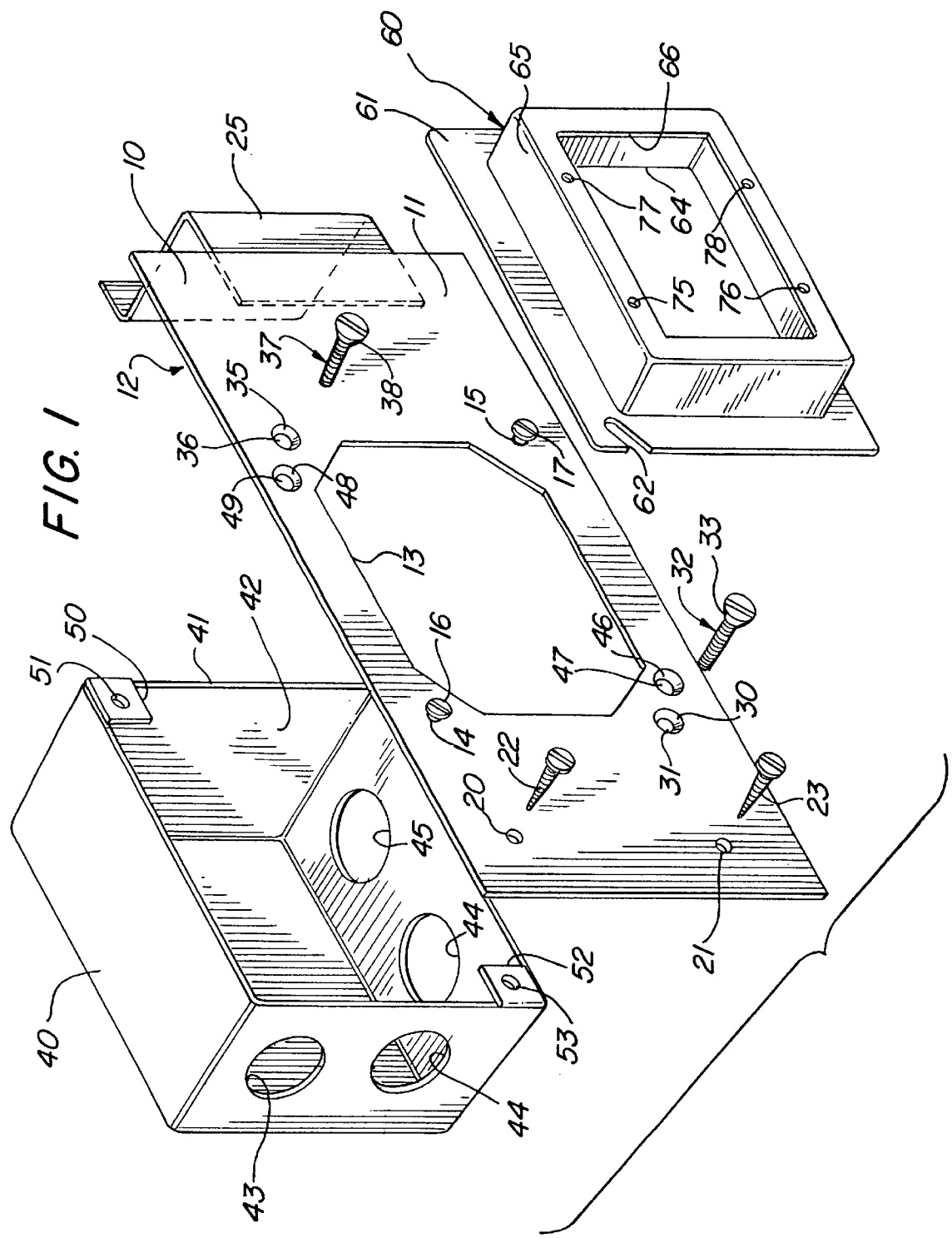
FIG. 1 sets forth a perspective assembly view of an electrical box mounting system constructed in accordance with the present invention.

FIG. 1 sets forth a perspective assembly view of an electrical box and mounting system constructed in accordance with the present invention. A generally planar bracket 10 fabricated in accordance with the present invention is preferably formed of a metal material and defines a front face 11, a rear face 12 and an aperture 13. A spacer 25 is secured to rear face 12 by conventional attachment such as a welded attachment or the like. Bracket 10 further defines a pair of apertures 14 and 15 which receive self taping fasteners 16 and 17 respectively. Bracket 10 further includes a pair of mounting apertures 20 and 21 which receive respective fasteners 22 and 23. Fasteners 22 and 23 are used to secure bracket 10 to a supporting wall stud, such as wall stud 24 shown in FIG. 2. Thus fasteners 22 and 23 preferably comprise conventional wood screws or self-taping sheet metal screws suitable for engaging the material of stud 24.

In accordance with an important aspect of the present invention bracket 10 further defines a pair of countersunk recesses 30 and 35 on opposite diagonal positions with respect to aperture 13. Recesses 30 and 35 define respective apertures 31 and 36 at the rear portions thereof. In further accordance with the preferred fabrication of the present invention a pair of fasteners 32 and 37 each having respective flushmount conical shaped heads 33 and 38 are received within recesses 30 and 35 respectively. Bracket 10 also defines a second pair of countersunk recesses 46 and 48 which define respective apertures 47 and 49. Countersunk recesses 46 and 48 accommodate alternative sizes of electrical box rings.

A conventional electrical box 40 preferably fabricated of a metal material or the like defines a generally rectangular or square box having a front edge 41 surrounding an open face within which a pair of diagonally positioned inwardly extending tabs 50 and 52 are formed. Box 40 is generally five sided forming an interior 42. In accordance with conventional fabrication techniques box 40 defines a plurality of access apertures, such as apertures 43 through 45 suitable for the insertion of electrical power connecting wires to communicate box 40 to the remainder of the electrical distribution system. In further accordance with conventional fabrication techniques apertures 43 through 45 are of appropriate size and shape to receive wire supporting elements such as conventional conduits or flexible wire covering and fittings. Tabs 50 and 52 define respective apertures 51 and 53 which facilitate attachment of box 40 to rear face 12 of bracket 10.

An electrical box ring 60 fabricated in accordance with conventional fabrication techniques includes a generally rectangular flange 61 supporting a forwardly extending riser 65 which in turn defines an aperture 66 therein. The rear portion of riser 65 forms an aperture 64 completing the ring-like structure of ring 60. Flange 61 further defines a pair of angled slots 62 and 63 (slot 63 seen in FIG. 2). In addition, a plurality of apertures such as apertures 75 though 78 are formed in the frontal face of riser 65 which facilitate attachment of conventional plug receptacles or switches or other apparatus (not shown). In the most typical attachment of such plug receptacles, switches or the like, apertures 75 though 78 are threaded or alternatively may receive self-taping threaded fasteners for secure attachment to riser 65. It will be noted that different electrical box rings may be used without departing from the present invention. Also the shape and size of box 40, aperture 13 and ring 60 may be varied without departing from the spirit and scope of the present invention.

In accordance with the present invention, bracket 10 is secured to a conveniently located wall stud such as wall stud 24 (seen in FIG. 2) using fasteners 22 and 23. In this attachment and as is better seen below in FIG. 3, spacer 25 is positioned against the underlying rear wall board such as wall board 18 shown in FIG. 3 to support the free end of bracket 10 within the wall space.

With bracket 10 firmly secured to a supporting wall stud, the present invention electrical box mounting system is assembled by positioning box 40 against rear face 12 of bracket 10 such that apertures 51 and 53 of tabs 50 and 52 are aligned with apertures 36 and 31 respectively. Thereafter, fasteners 32 and 37 are aligned with apertures 31 and 36 respectively and threaded into apertures 53 and 51. In the preferred fabrication of the present invention, fasteners 32 and 37 are self-taping fasteners. Alternatively however, apertures 51 and 53 may be provided with preformed threads allowing the use of conventional threaded fasteners. In either event the attachment of box 40 to rear face 12 is completed by engaging fasteners 32 and 37 fully against tabs 50 and 52 driving conical head 33 of fastener 32 into recess 30 and driving conical head 38 of fastener 37 into recess 35. Sufficient torque is applied to fasteners 32 and 37 to draw edge 41 firmly against rear face 12 in the assembly shown in FIGS. 3 and 4. In accordance with an important aspect of the present invention, the attachment of box 40 to rear face 12 of bracket 10 is solely provided by fasteners 32 and 37 within tabs 52 and 50 respectively. Thus box 40 is fully secured to bracket 10 independent of ring 60 thereby providing the flexibility and easy removal of ring 60 from bracket 10 without disturbing box 40 which characterizes an important advantage of the present invention electrical box mounting system.

In accordance with an important aspect of the present invention, the assembly of bracket 10 to box 40 is at this point complete and the attachment of ring 60 may be undertaken at a later time. In this manner, ring 60 may be changed to accommodate the thickness of wall covering material overlying bracket 10 (not shown) or changes in the type of ring required for attachment due to changes in the coupling or switching devices to be secured thereto. Thus the complete attachment of box 40 against bracket 10 allows the complete wiring of box 40 with appropriate wires and conduit couplings as needed without a concern for the installation of ring 60.

Figure 2:
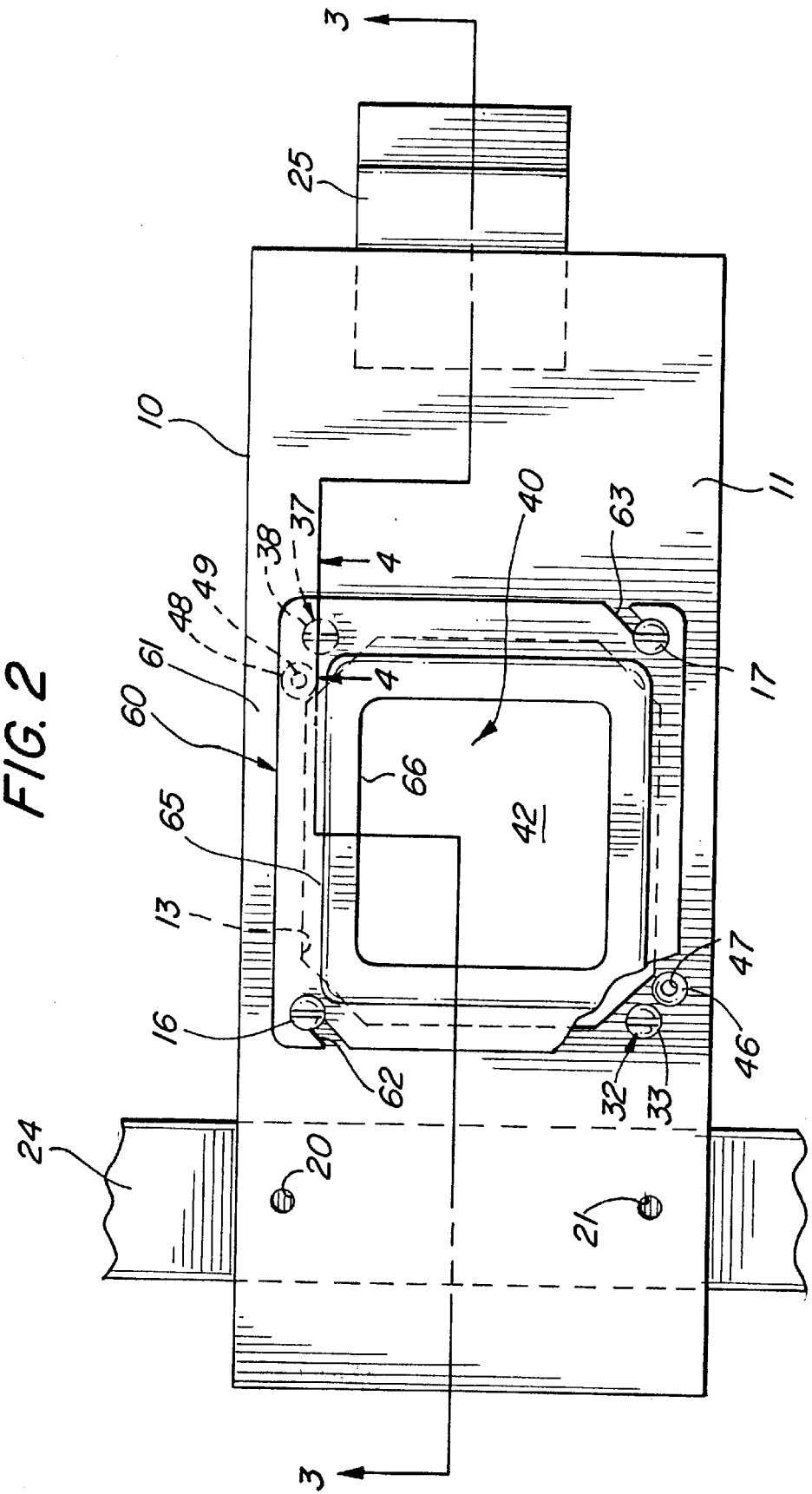
FIG. 2 sets forth a partially broken section front view of the present invention electric box mounting system installed in a typical wall installation.

In further accordance with the present invention, ring 60 is secured to front face 11 of bracket 10 when required by simply inserting angled slots 62 and 63 (slot 63 seen in FIG. 2) beneath fasteners 16 and 17 in the manner shown in FIG. 2. Thereafter fasteners 16 and 17 are tightened to secure flange 61 against front face 11 of bracket 10. It will be noted that this attachment of ring 60 overlying fasteners 32 and 37 is facilitated by countersunk recesses 30 and 35 and cooperating flushmount type fasteners 32 and 37 and their respective conically shaped heads 33 and 38. The improvement provided by the independent fastening of box 40 to bracket 10 using such flush mount fasteners allows ring 60 to be secured independently from the attachment of box 40. This in turn provides the substantial improvement of the present invention by which ring 60 may be removed and replaced without disturbing the attachment of box 40 to bracket 10.

FIG. 2 sets forth a partially sectioned front view of an electrical box mounting system fabricated in accordance with the present invention. As described above, a generally planar bracket 10 includes a pair of apertures 20 and 21 which facilitate attachment of bracket 10 to a convenient wall stud 24. As is also described above, bracket 10 includes countersunk recesses 30, 35, 46 and 48 and a spacer 25 secured to a rear face 12 (all seen in FIG. 1) of bracket 10 using conventional attachment such as welding or the like. Bracket 10 defines a front face 11 to which a ring 60 is secured in accordance with the present invention assembly. More specifically, bracket 10 defines an aperture 13 having threaded fasteners 16 and 17 positioned diagonally with respect thereto. Bracket 10 further supports a pair of fasteners 32 and 37 (seen in FIG. 1) having flushmount conical heads 33 and 38 respectively. As described above in FIG. 1, heads 33 and 38 are received within countersunk recesses 30 and 35 to provide flushmounting of heads 33 and 38 in securing box 40. Box 40 is positioned in the manner seen in FIG. 3 such that interior 42 is substantially aligned with aperture 13 of bracket 10.

Ring 60 defines a flange 61 having angled slots 62 and 63 positioned at diagonal corners thereof. Flange 61 is secured to front face 11 of bracket 10 by fasteners 16 and 17 received within slots 62 and 63 respectively. In accordance with the preferred fabrication of the present invention flange 61 overlies flushmounted heads 33 and 38. In accordance with the assembly described above it will be recalled that heads 33 and 38 are tightened against box 40 drawing heads 33 and 38 into their respective countersunk recesses to provide a flush surface upon front face 11. This flush surface allows the attachment of ring 60 without interference from fasteners 32 and 37 (seen in FIG. 1). Ring 30 further includes a riser 65 defining an opening 66 therein.

Thus with the completed assembly shown in FIG. 2, box 40 is secured to bracket 10 in an attachment independent from fasteners 16 and 17 which secure ring 60. As a result, ring 60 may be easily removed and replaced without disturbing the attachment to box 40 provided by fasteners 32 and 37.

Figure 3:
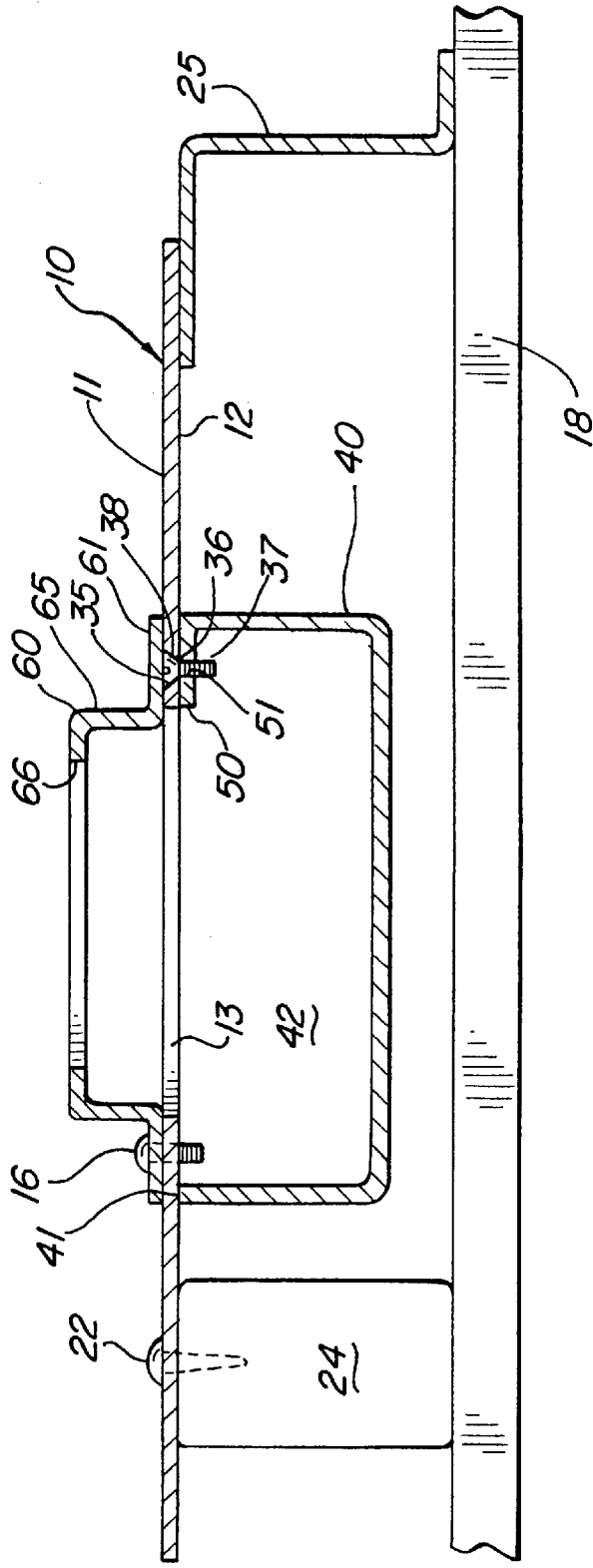
FIG. 3 sets forth a section view of the present invention electric box mounting system of FIG. 2 taken along section lines 3—3 therein.

FIG. 3 sets forth a section view of the electrical box mounting system shown in FIGS. 1 and 2 taken along section lines 3—3 in FIG. 2. Also shown in FIG. 3 is a portion of a conventional wall board 18 and an illustrative wall stud 24. In accordance with the present invention, bracket 10 defines a generally planar member having a front face 11 and a rear face 12. Bracket 10 is secured to wall stud 24 by a pair of conventional fasteners 22 and 23 (fastener 23 shown in FIG. 2). Bracket 10 further includes a spacer 25 secured to rear face 12 of bracket 10 which rests upon the interior surface of wall board 18. Spacer 25 is conventional in fabrication and operates to provide support for the end of bracket 10. Bracket 10 further includes an aperture 13 and a countersunk recess 35. Recess 35 defines and aperture 36 which receives a fastener 37. Fastener 37 defines a conically shaped head 38 received within recess 35 and a self-treading portion extending through aperture 36. An electrical box 40 fabricated in accordance with conventional fabrication techniques defines an interior 42 and open edge 41. Box 40 further defines an inwardly extending tab 50 having an aperture 51 formed therein. Fastener 37 is preferably formed of self-taping type fastener and is threaded through aperture 51 drawing edge 41 against surface 12 of bracket 10 and securing conical head 38 within countersunk recess 35. The important aspect of this attachment is the provision of a flush surface upon front surface 11. It will be recalled with temporary return to FIG. 1 that a corresponding countersunk recess 30 receives a corresponding fastener 32 in the same manner as shown for fastener 37 and recess 35 to complete the attachment of electrical box 40. Thus in accordance with the present invention, box 40 is fully secured to bracket 10 by fasteners 32 and 37 (fastener 32 seen in FIG. 1).

In further accordance with the present invention, a riser 65 having a flange 61 and an opening 66 is secured to front face 11 of bracket 10 using a pair of fasteners 16 and 17 (fastener 17 seen in FIG. 2). Once again it must be emphasized that the attachment of ring 60 is provided by fasteners 16 and 17 in an independent attachment to box 40 provided by fasteners 32 and 37 thereby facilitating the removal and attachment of ring 60 without disturbing the attachment of box 40. This advantage is substantial in allowing practitioners to assemble bracket 10 and box 40 without assembling ring 60 until a later stage thereby facilitating changes to ring 60 to accommodate wall covering thickness or apparatus to be secured to the ring.

Figure 4:
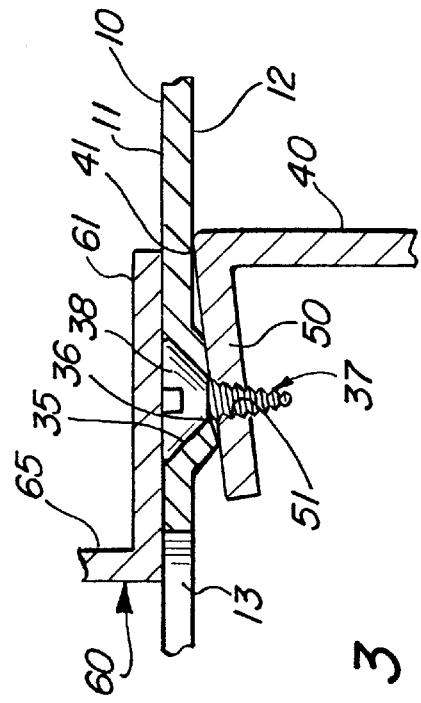
FIG. 4 sets forth a partial section view of the mounting box system of FIG. 2 taken along section lines 4—4 therein.

FIG. 4 sets forth an enlarged partial section view of the attachment of box 40 and ring 60 to bracket 10 provided by the above described combination of countersunk recesses and flushmounting fasteners. FIG. 4 shows the attachment of fastener 37 to tab 50 using recess 35 formed in bracket 10. It will be understood however that the attachment provided by fastener 32 within countersunk recess 30 engaging tab 52 (seen in FIG. 1) is identical to the attachment shown in FIG. 4. Accordingly, the descriptions set forth in connection with FIG. 4 will be understood to apply equally well to the attachment provided by fastener 32 against tab 52.

More specifically, bracket 10 defines a countersunk recess 35 having an aperture 36 at the lower end thereof. Bracket 10 further defines a front face 11, a rear face 12 and an opening 13. Ring 60 includes a riser 65 and a flange 61. The assembly of ring 60 to bracket 10 is described above in greater detail in connection with FIGS. 1–3. Suffice it to note here that ring 60 is secured to surface 11 of bracket 10 such that flange 61 overlies a portion thereof. Box 40 defines an edge 41 drawn against surface 12 of bracket 10 and secured by an inwardly extending tab 50 having an aperture 51 formed therein. In accordance with the present invention a fastener 37 having a self-taping threaded portion is threadably engaged through aperture 51 such that conically shaped head 38 thereof is drawn into recess 35. The use of a flushmount head for fastener 37 allows flange 61 of riser 60 to be positioned upon surface 11 in a flat surface contact. The attachment of box 40 to bracket 10 provided by fastener 37 is as a result independent of the attachment of ring 60 to bracket 10. In this manner the above described advantages of independent ring attachment and removal are provided.

Figure 5:
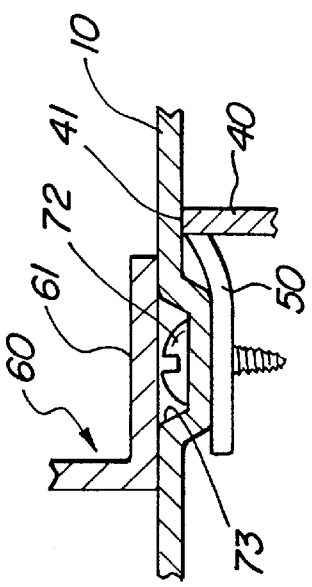
FIG. 5 sets forth a partial section view of an alternate embodiment of the present invention.

FIG. 5 sets forth a partial section view of an alternate embodiment of the present invention which differs from the embodiment shown in FIGS. 1 through 4 solely in its use of a countersunk recess 73 which is shaped to receive an alternative type of flushmount fastener 72. In the use of fastener 72, tab 50 of box 40 is engaged by fastener 72 to draw edge 41 against bracket 10 and draw the head of fastener 72 into recess 73 and allow flange 61 of ring 60 to be flush against the underlying surface of bracket 10.

FIG. 6 sets forth a front view of a multi box supporting bracket constructed in accordance with the present invention and generally referenced by numeral 100. Bracket 100 is preferably formed of a rigid material such as steel or the like and defines a generally planar body 101 having opposed end portions 102 and 103. End portion 102 supports a plurality of rows of apertures 104, 105 and 106 which receive fasteners to secure bracket 100 to a convenient wall stud (not shown). Similarly, end portion 103 defines a plurality of rows of apertures 107, 108 and 109 which are used to secure bracket 100 to a convenient wall stud using conventional fasteners (not shown). It will be apparent to those skilled in the art, that the pluralities of apertures at end portions 102 and 103 facilitate accommodation of different wall stud spacings.

In accordance with the preferred fabrication of the present invention, planar body 101 defines a plurality of box apertures 120, 140 and 160. Box apertures 120, 140 and 160 are substantially identical to aperture 13 of bracket 10 shown in FIG. 1. It will be apparent to those skilled in the art, that while bracket 100 is shown having a trio of box apertures, different pluralities of box apertures may be formed in bracket 100 without departing from the spirit and scope of the present invention. In the preferred fabrication of the present invention however, an odd number of box apertures is utilized to provide a midpoint or center aperture which corresponds to box aperture 140. This centering of box aperture 140 allows the corresponding centering of one or more electrical boxes between a pair of adjacent wall studs.

Box apertures 120, 140 and 160 may be utilized in the identical manner set forth above which facilitates attachment of corresponding boxes and rings identical to box 40 and ring 60 (shown in FIG. 1). In the fabrication shown in FIG. 6, a plurality of elongated tapered apertures 121, 122 and 123 are positioned at one corner of box aperture 120 while a plurality of elongated tapered apertures 124, 125 and 126 are diagonally positioned with respect thereto. Apertures 121 through 126 are elongated to facilitate passage of a fastener head through the larger portions thereof and are counter sunk to provide attachment at the narrower portions thereof by a fastener in the manner shown for fastener 32 (seen in FIG. 1). Thus, it will be understood that elongated apertures 121 through 126 define countersunk portions which may receive a conical head of a conventional flush mount fastener.

Bracket 100 further includes a pair of diagonally positioned apertures 129 and 130 utilized in receiving a fastener in the manner shown in FIG. 7. Apertures 129 and 130 are utilized to provide additional attachment to an electrical box such as box 40 shown in FIG. 1 in the event additional pairs of inwardly extending flanges are utilized to provide four corner attachment of the electrical box. The attachment of a fastener within apertures 129 and 130 is shown in FIG. 7 in greater detail. However, suffice it to note here, that apertures 129 and 130 are selected in size to accommodate a fastener such as fastener 112 shown in FIG. 7 having a thin flexible head 115. Bracket 100 further includes a pair of diagonally positioned 127 and 128 which correspond to apertures 14 and 15 of bracket 10 shown in FIG. 1. Thus, fasteners are received within apertures 127 and 128 in the same manner as fasteners 16 and 17 are received within apertures 14 and 15 of bracket 10 shown in FIG. 1 to support a conventional ring such as ring 60 also shown in FIG. 1.

Thus, in accordance with the anticipated application of bracket 100, a conventional electric box and ring such as box 40 and ring 60 shown in FIG. 1 is secured to bracket 100 in the manner described above in alignment with box aperture 120 to provide a removable ring and box attachment.

In further accordance with the present invention, bracket 100 provides a repeat pattern of apertures surrounding and associated with box apertures 140 and 160 to provide attachment of a second and third electrical box and ring in the above described manner. Thus, bracket 100 includes a plurality of elongated tapered countersunk apertures 141 through 146 positioned at diagonal trios on each side of box apertures 140 together with apertures 149 and 150 and apertures 147 and 148. Similarly, a plurality of elongated tapered countersunk apertures 161 through 163 are positioned in opposed trios on opposite diagonal positions of box aperture 160. In addition, a pair of apertures 167 and 168 are positioned at opposite corners of box apertures 160 together with apertures 169 and 170. Thus, bracket 100 is able to support a plurality of electrical boxes and rings in the manner set forth above in FIG. 1 by which box 40 and ring 60 are supported upon bracket 10. The attachment of multiple boxes and rings to bracket 100 is accomplished in the manner described above to provide removable attachment and the benefits thereof for the trio of rings secured in alignment with box apertures 120, 140 and 160.

FIG. 7 sets forth a partial section view of the alternate attachment of a box and ring to bracket 100 using a flexible head screw. Thus, as described above, bracket 100 defines an aperture 129. A flange 110 of a ring is positioned upon one side of bracket 100 while a box flange 111 having an aperture 116 is positioned at the opposite side of bracket 100. Aperture 116 is generally aligned with aperture 129 of bracket 100. A fastener 112 includes a flexible generally flat head 115 which defines a conventional Philips-type engagement recess (not shown). Fastener 112 passes through aperture 129 and aperture 116 and is secured with a conventional nut 114. Fastener 112 is shown in dash-line representation in its relaxed or unflexed shape. In the attachment utilized to provide attachment of an electrical box using apertures 129 and 130 (seen in FIG. 6), faster 112 is drawn tightly by rotation of fastener 112 with respect to nut 114. The thin structure of head 115 is flexed and drawn downwardly into aperture 129 against box flange 111. The flexing of head 115 into aperture 129 allows flange 110 of the attached ring (not shown) to be positioned upon one surface of bracket 100. In this manner, an alternative type of "flushmount" may be provided. In this manner, the ring remains removable from bracket 100 with the advantages described above.

What has been shown is an electrical box mounting system which utilizes a relatively minor modification of the electrical box supporting bracket to facilitate a flushmount attachment of the electrical box to the bracket which is independent of and which is free of interference with the electrical box ring attachment. In this manner the electrical box ring may be independently removed from and assembled to the supporting bracket without disturbing the attachment of the electrical box. This in turn provides substantial advantage in the field installation of electrical boxes by allowing the installers to install the bracket and secured electrical box together with all necessary connecting wiring without requiring the assembly of the electrical box rings. As a result, the choice of electrical box ring to be utilized for each electrical box may be determined at a later date and may be changed to suit changing needs of fabrication without disturbing the electrical box attachment to the bracket.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. An electrical box assembly comprising:

a generally planar bracket having opposed ends defining wall stud apertures therein and said bracket having a plurality of box apertures, a front face, a rear face, a plurality of first pairs of fastener apertures each pair diagonally positioned with respect to one of said box apertures, a plurality of pairs of countersunk recesses each pair diagonally positioned with respect to one of said box apertures and each defining a second pair of fastener apertures therein;

a plurality of electrical boxes each having an open face, a frontal edge and a pair of diagonally positioned inwardly extending tabs each tab having a tab aperture formed therein;

a plurality of pairs of flushmount fasteners each having a threaded portion and a fastener head, said pairs of flushmount fasteners being received in said countersunk recesses such that said fastener heads are received in said recesses and said threaded portions pass through said second pair of fastener apertures and engage said tab apertures to secure one of said edges of said electrical boxes against said rear surface;

a plurality of electrical box rings each having a flange defining a pair of slots and a riser portion; and a plurality of pairs of threaded fasteners each threadably engaging said first pairs of fastener apertures, said electrical box rings being secured to said front face of said bracket by said pairs of threaded fasteners in said first pairs of fastener apertures such that said flanges are placed against said front face overlying said fastener heads of said pairs of flushmount fasteners.

2. The electrical box assembly set forth in claim 1 wherein said countersunk recesses are generally conically shaped and wherein said fastener heads of said pair of flushmount fasteners are conically shaped to be received therein.

3. The electrical box assembly set forth in claim 2 wherein said wall stud apertures in said bracket comprise aperture pairs and wherein said wall stud apertures receive fasteners to secure said bracket to adjacent wall studs.

4. An electrical box assembly comprising:

a plurality of electrical boxes;

a plurality of rings;

a generally planar bracket defining a plurality of box apertures formed therein, a rear surface for supporting said plurality of electrical boxes, a front surface for supporting said plurality of rings and opposed end portions each end portion defining a plurality of wall stud apertures; and a plurality of fasteners received within said wall stud apertures to secure said opposed ends to a pair of wall studs.

5. The electrical box assembly set forth in claim 4 wherein said plurality of box apertures includes a center box aperture positioned at the general mid point of said bracket.

6. The electrical box assembly set forth in claim 5 wherein said plurality of box apertured is three.

* * * * *